Sept. 28, 1926.
W. J. ERDMANN
BIRD BATHHOUSE
Filed July 19, 1923
1,601,203
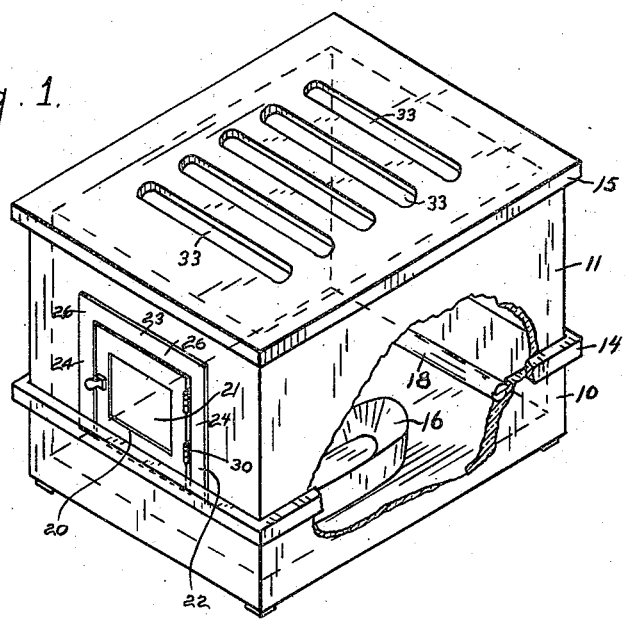
Fig. 1.
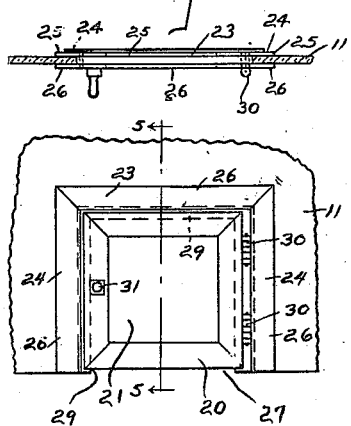
Fig. 4.
Fig. 3.
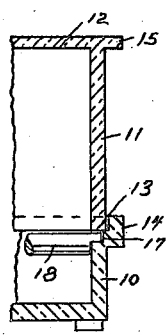
Fig. 5.
Fig. 2.
INVENTOR.
William J. Erdmann
BY
Erwin, Wheeler & Woolard
ATTORNEYS Patented Sept. 28, 1926.

1,601,203

UNITED STATES PATENT OFFICE.

WILLIAM J. ERDMANN, OF MILWAUKEE, WISCONSIN.

BIRD BATHHOUSE.

Application filed July 19, 1923. Serial No. 652,475.

This invention relates to improvements in bird-houses.

It is the primary object of this invention to provide a house or cage for a bird which is entirely suitable for use as a bath-house.

More particularly stated, it is my object to provide a sanitary structure in which a bird can be confined for bathing purposes, which structure will be easily cleaned, well ventilated, well lighted and readily manipulated.

In order to satisfy a part of the objects above specified, it is preferred that the structure herein disclosed shall be made of glass or other vitreous and transparent material. It is a further object of this invention to provide for such a structure a door frame which can readily be positioned thereon; and a door with which the structure will co-operate to secure the door in place without complicated latches or other retaining devices. I desire also to provide a door frame which can readily be removed for cleaning purposes, since a door frame would ordinarily provide crevices of the type most apt to form lodging places for insects or bacteria.

In the drawings:—

Figure 1 is a perspective view of a structure embodying this invention, parts of the wall being broken away to expose the interior thereof.

Figure 2 is a fragmental transverse section through the structure shown in Figure 1.

Figure 3 is a fragmental elevation of the side of the structure, showing the door frame and door therein.

Figure 4 is a plan view of the door frame, adjacent walls of the structure being shown in section.

Figure 5 is a sectional view taken on line 5—5 of Fig. 3.

Like parts are identified by the same reference characters throughout the several views.

The structure herein disclosed is not intended to house a bird at all times. It is primarily intended for a bath-house. Lice which trouble pet birds, such as canaries, can be dealt with most effectively by removing the bird from the cage and then scouring the cage. For the purpose of confining the bird during the scouring operation this house is particularly adapted in that it is provided with an independent door and is, in reality, a separate cage.

Most owners of birds allow the birds to bathe in the wicker or wire cages in which they are permanently kept. This practice is, however, to be avoided since the methods followed by most birds in taking their baths result in distributing the water from the bathing dish about the cage and about the room in which the cage is located. It has been my experience that no structure used as a bath-house should have an opening in its side through which water might escape during the bathing operation.

The house or cage herein disclosed is preferably made in two separate parts,—a base 10 in the form of a shallow pan and a top portion 11 which includes side walls and a cover 12. The members 10 and 11, as has been suggested above, may conveniently be made of glass in order to freely admit light to the interior of the structure. The member 11 is preferably supported from the base 10 by means of a shoulder 13 formed by the provision of flange 14 upon the base. This arrangement is not only adapted for cheap construction but is also readily cleaned and easily operable to permit the removal of the upper member 11 from the base. A flange 15 may be provided upon the cover member 11 to correspond with the flange 14 upon the base. These flanges not only enhance the appearance of the article but also serve to facilitate its manipulation. A glass article when wet is apt to be slippery and the provision of flanges 14 and 15 reduces the possibility of the article slipping from the hands of the operator and becoming broken.

It will be noted that since the base 10 is made integrally of glass it is necessarily water tight and might serve to contain the water in which the bird is to be permitted to bathe. If desired, however, a pan 16 of the ordinary type provided for a bird bath may be inserted into the structure and may rest on the floor of the base member 10. If it is desired to provide a perch for the bird accommodation can readily be made therefor by the provision in the walls of the base member 10 of oppositely disposed notches 17 adapted to receive the ends of perch 18. The perch will be rigidly maintained in position within the notches when the cover member 11 is in place.

The bird is introduced into the device through a door 20 which may include a pane of glass 21. In order to mount the door for hinged movement with respect to the cover member 11, I have provided a novel door frame 22 which may readily be wholly removed from the device for cleaning purposes and obviates the necessity for drilling holes in the glass wall of the cover member.

The door frame 22 comprises a top rail 23 and side rails 24. All of these rails are constructed in the same manner, each being provided with spaced flanges 25 and 26. The space between these flanges is sufficient to receive the wall of the upper portion 11 of the device. This wall is formed to provide an aperture opening downwardly as shown at 27, said aperture corresponding in width to the door frame minus the flanges 25 and 26 at the sides thereof. Accordingly, it will be obvious that said frame may be slid upwardly into the aperture with said flanges embracing the wall cover 11 upon its inner and outer sides respectively. The door frame is frictionally retained in place and hinges 30 connect the door 20 to the frame. A handle 31 may be added to facilitate the opening of the door if desired. The door frame may include a stop 29 against which the door may swing to make a tight joint through which spray will not penetrate.

It will be noted that the door frame preferably has no bottom rail and the door 20 therefor extends normally below the flange 14. As a result of this arrangement, the door is normally held against opening by its contact with said flange and can only be opened when the cover member 11 is lifted from shoulder 13 sufficiently to allow the door to clear flange 14. When retained in place as aforesaid the door will preferably fit with sufficient accuracy to prevent water or spray from being thrown therethrough.

In order to provide air for the occupant of the cage or house a plurality of louvers or slots 33 are formed in the cover member 11. It is particularly to be noted that these slots are the only openings in the cage when the door is in its normally closed position. Light will pass freely through the walls of the cage and air is admitted solely through the slots 33. Inasmuch as these slots are in the top of the structure it will practically be impossible for water or spray to be thrown therethrough. Should any water or spray escape it would be traveling almost vertically and would consequently fall at no considerable distance from the cage.

It is further to be noted that although it is necessary to lift the cover member 11 in order to open door 20, the door when open will retain the cover member 11 in its slightly elevated position. The weight of the cover member exerted through the door will bind the door frictionally against hinged movement and will thereby relieve the operator from the necessity of attending to the position of the door. In this manner the transfer of the bird between its regular cage and the bird-house herein disclosed is greatly facilitated.

As has previously been explained, this structure is of a material and of a construction rendering it very easily cleaned. It provides no inaccessible corners in which dirt, bacteria or lice can be concealed. Further the door structure is wholly removable for cleansing or other purposes and is so disposed as to facilitate the introduction or removal of a bird into the house and, when closed, wholly prevents the escape of water from the house.

I claim:—

1. In a device of the character described, the combination of a glass tray, a glass cover therefor having integral walls and top and provided with a door opening and with a plurality of restricted ventilation openings having glass margins, a door frame fitted to said door opening and supported from adjacent portions of said cover, and a door operatively mounted in said frame.

2. A bird bath-house comprising a base tray having an interior shoulder formed adjacent its upper margin, a cover removably supported by said shoulder and including a top and walls providing a door aperture, and a door hingedly mounted for movement relatively to a wall providing said aperture, said door, when closed, having its lower margin below the margin of said tray, whereby the door is secured against accidental opening.

3. In a bird bath-house, a glass tray provided with an internal shoulder adjacent its upper margin, a glass cover removably supported by said shoulder and including a wall providing a downwardly opening door aperture and a top having ventilating apertures, a door frame slidable in said door aperture and grooved to embrace the wall adjacent thereto, and a door hingedly connected with said frame.

4. In a bird bath-house, a glass tray provided with an internal shoulder adjacent its upper margin, a glass cover removably supported by said shoulder and including a wall providing a downwardly opening door aperture and a top having ventilating apertures, a door frame slidable in said door aperture and grooved to embrace the wall adjacent thereto, and a door hingedly connected with said frame and adapted in the normal position of said cover to be secured within the margin of said tray.

WILLIAM J. ERDMANN.